United States Patent [19]

Kress et al.

[11] Patent Number: 4,895,898

[45] Date of Patent: Jan. 23, 1990

[54] THERMOPLASTIC MOLDING MATERIALS OF IMPROVED PROCESSABILITY

[75] Inventors: Hans-Jürgen Kress, Krefeld; Herbert Eichenauer, Dormagen; Horst Peters, Leverkusen; Jochen Schoeps, Krefeld; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 159,481

[22] Filed: Feb. 16, 1988

Related U.S. Application Data

[63] Continuation of Ser. No. 886,810, Jul. 16, 1986, abandoned.

[30] Foreign Application Priority Data

Jul. 25, 1985 [DE] Fed. Rep. of Germany ....... 3526552

[51] Int. Cl.$^4$ .............................................. C08L 69/00
[52] U.S. Cl. ...................................... 525/67; 525/146; 524/504
[58] Field of Search ................................ 525/67, 146

[56] References Cited

U.S. PATENT DOCUMENTS

| | | | |
|---|---|---|---|
| 2,802,809 | 8/1957 | Hayes | 525/316 |
| 3,663,471 | 6/1972 | Schirmer | 525/67 |
| 3,960,824 | 6/1976 | Hicks | 526/224 |
| 4,204,047 | 3/1978 | Margotte et al. | 525/67 |
| 4,205,140 | 5/1980 | Licbig | 525/67 |
| 4,412,040 | 10/1983 | Albee | 525/143 |
| 4,440,905 | 4/1984 | Dunkelberger | 525/66 |

FOREIGN PATENT DOCUMENTS

| | | |
|---|---|---|
| 0062838 | 10/1982 | European Pat. Off. . |
| 0080767 | 6/1983 | European Pat. Off. . |
| 3332325 | 3/1985 | Fed. Rep. of Germany . |
| 2383992 | 3/1978 | France . |

OTHER PUBLICATIONS

Chemical Abstracts, Book 81, No. 4, Jul. 29, 1974, p. 43, Zusammenfassung Nr. 14305n, Columbus, Ohio, U.S. & JP-A-74 00 353.
(Teijin Chemicals Ltd. et al.), 05-01-1974.
"Structure and Properties of Polymers" by H. V. Boenig, pp. 256–267, Georg Thiene Publishers (1973).
"Analytical Study of ABS Copolymers Using a Preparative Ultracentrafuge" by Chauvel and Daniel in Advances in Chemistry Series 142, entitled Copolymers, Polyblends, and Composites, pp. 159–171, ACS (1975).

Primary Examiner—Patricia Short
Attorney, Agent, or Firm—Connolly and Hutz

[57] ABSTRACT

The present invention relates to thermoplastic molding materials containing thermoplastic polycarbonates, graft polymers and two different copolymers and, if appropriate, customary amounts of fire-retarding agents, stabilizers, pigments, mould release agents and/or antistatic agents, and to a process for the preparation of these molding materials.

4 Claims, No Drawings

THERMOPLASTIC MOLDING MATERIALS OF IMPROVED PROCESSABILITY

This application is a continuation of application Ser. No. 886,810 filed July 16, 1986, now abandoned.

The present invention relates to thermoplastic polycarbonate moulding materials containing (A) 20-80 parts by weight of a thermoplastic polycarbonate, (B) 10-60 parts by weight of one or more graft polymers composed of (B.1) 5-90 parts by weight, preferably 30-80 parts by weight, of a mixture of (B.1.1) 50-95% by weight of styrene, α-methylstyrene, nuclear-substituted styrene, methyl methacrylate or mixtures thereof, and (B.1.2) 50-5% by weight of (meth)acrylonitrile, methyl methacrylate, maleic anhydride, N-substituted maleimide or mixtures thereof, grafted on to (B.2) 95-10 parts by weight, preferably 70-20 parts by weight, of a rubber having a glass temperature $TG \leq 10°$ C., and (C) 10-70 parts by weight of a thermoplastic copolymer having an intrinsic viscosity of 20 to 110 ml/g, preferably 30 to 90 ml/g (measured in dimethylformamide at 25° C.) and formed from (C.1) 50-95% by weight of styrene, α-methylstyrene, nuclear-substituted styrene, methyl methacrylate or mixtures thereof, and (C.2) 50-5% by weight of (meth)acrylonitrile, methyl methacrylate, maleic anhydride, N-substituted maleimide or mixtures thereof, the total of the parts by weight (A)+(B)+(C) amounting in each case to 100 parts by weight, and (D) 0.5 to 7.5 parts by weight, preferably 1 to 5 parts by weight, relative to 100 parts by weight of (A)+(B)+(C), of a copolymer formed from (D.1) 0-90% by weight of styrene, α-methylstyrene, nuclear-substituted styrene, methyl methacrylate or mixtures thereof, and (D.2) 100-10% by weight of (meth)acrylonitrile, methyl methacrylate, maleic anhydride, N-substltuted maleimide or mixtures thereof, and characterized in that the component (D) has an intrinsic viscosity [η] of 2 to 10 ml/g, preferably 4 to 7 ml/g (measured in dimethylformamide at 25° C.), the chain length of the copolymer (D) being regulated by means of $C_1$–$C_{18}$-alkyl mercaptans.

The mixtures, according to the invention, of polycarbonates, graft polymers and copolymers can also contain the additives which are customary in the chemistry of polycarbonates or graft polymers or copolymers, such as fire-retarding agents, stabilizers, pigments, mould release agents and/or antistatic agents, in the customary amounts.

As a result of the addition of the component (D), polycarbonate/ABS moulding materials which have an improved flow and hence an improved processability are obtained.

This means that injection mouldings of a large size or those having a complicated structure, for example computer casings or components for the automotive industry, can be produced more easily or with exposure to a lower temperature, by virtue of the improved flow.

The invention also relates, therefore, to the use of these copolymers (D), which have an intrinsic viscosity of 2 to 10 ml/g, preferably 4 to 7 ml/g, for the production of mixtures having good flow and composed of aromatic polycarbonate (A), one or more graft polymers (B) and copolymer (C).

Mixtures of polycarbonates with ABS polymers are known (see, for example, DE-OS No. (German Published Specification) 2,259,656 or EP-OS No. (European Published Specification) 5202).

EP-OS No. (European Published Specification) 0,080,767 discloses mixtures of polycarbonates, copolymers and two different graft polymers, to which good flow properties combined with good toughness, hardness, stiffness and good values in the falling ball test are ascribed.

Mixtures having a good flow behavior are also disclosed in EP-OS No. (European Published Specification) 0,104,695; they consist of polycarbonates, graft polymers, copolymers and polyurethanes. Compared with such mixtures, it is possible, by the use of the component (D), to achieve better flow, especially in the production of complicated components. In addition, no undesired reactions, caused by the presence of products which are not polycarbonates, graft polymers or copolymers can occur at fairly high processing temperatures. Furthermore, the use of the component (D) can, as a result of the high sulphur content, have a stabilizing effect on the whole moulding material.

Thermoplastic, aromatic polycarbonates according to component (A) which are suitable in accordance with the invention are those based on the diphenols of the formula (I)

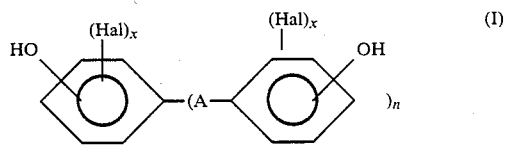

wherein A is a single bond, $C_1$–$C_5$-alkylene, $C_2$–$C_5$-alkyliden $C_5$–$C_6$-cycloalkylidene, —S— or —$SO_2$—, Hal is chlorine or bromine, x is 0, 1 or 2 and "n" is 1 or 0, or the formula (Ia)

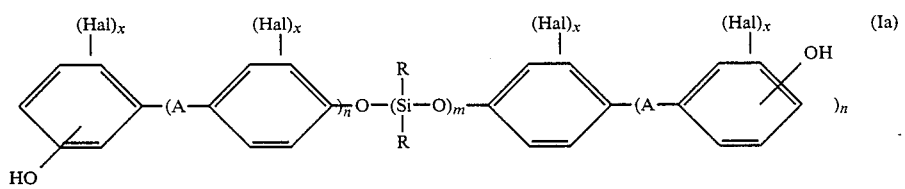

wherein A, Hal, x and "n" have the meaning mentioned for formula (I) and the Rs are identical or different and are linear $C_1$–$C_{20}$-alkyl, branched $C_3$–$C_{20}$-alkyl or $C_6$–$C_{20}$-aryl, preferably $CH_3$, and "m" is an integer between 5 and 100, preferably between 20 and 80.

Polycarbonates according to component (A) which are suitable in accordance with the invention are both homopolycarbonates and copolycarbonates, the diphenols of the formula (Ia) being employed only for the preparation of copolycarbonates with the diphenols of the formula (I), and the proportion by weight of diphenols of the formula (Ia) in the copolycarbonates being in each case between 1 and 20% by weight, preferably between 1.5 and 15% by weight and especially between 2 and 10% by weight, relative in each case to the total weight of the diphenols of the formulae (I) and (Ia) employed.

The diphenols of the formula (I) are either known from the literature or can be prepared by processes known from the literature; polydiorganosiloxanes having hydroxyaryloxy end groups according to formula (Ia) are also known (see, for example, U.S. Pat. No. 3,419,634) or can be prepared by processes known from the literature.

The preparation of the polycarbonates according to component (A) which are suitable in accordance with the invention is known from the literature and can be effected, for example, by means of phosgene in the phase boundary process or by means of phosgene in the homogeneous phase process (the so-called pyridine process), the molecular weight to be set in a particular case being achieved in a known manner by means of an appropriate amount of known chain stoppers (in regard to polycarbonates containing polydiorganosiloxanes see, for example, DE-OS No. (German Published Specification) 3,334,872).

Examples of suitable chain stoppers are phenol, pchlorophenol, p-tert.-butylphenol or 2,4,6-tribromophenol, but also long-chain alkylphenols, such as 4-(1,3-tetramethylbutyl)-phenol in accordance with DE-OS No. No. (German Published Specification) 2,842,005 or monoalkylphenols or dialkylphenols having a total of 8 to 20 C. atoms in the alkyl substituents in accordance with German Patent Application No. P 3,506,472.2 (Le A 23 654), such as 3,5-ditert.-butylphenol, p-isooctylphenol, p-tert.-octylphenol, p-dodecylphenol, 2-(3,5-dimethylheptyl)-phenol and 4-(3,5-dimethylheptyl)-phenol.

The polycarbonates according to component (A) which are suitable in accordance with the invention have average number average molecular weights ($\overline{M}w$, measured, for example, by ultracentrifugation or light scattering measurements) of 10,000 to 200,000, preferably 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1,-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable diphenols of the formula (Ia) are those in which R is methyl, ethyl, propyl, n-butyl, tert.-butyl or phenyl.

Preferred diphenols of the formula (Ia) are those of the formula (Ib)

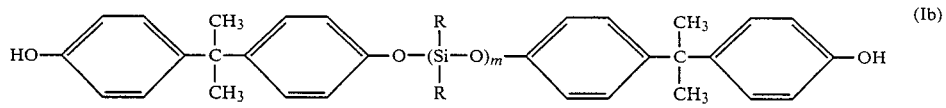

wherein the Rs are identical and have the meanings mentioned above, that is to say denote methyl etc. or phenyl, and m is once more an integer between 5 and 100, preferably between 20 and 80.

The preparation of the diphenols of the formula (Ia) can be effected, for example, from the corresponding bis-chloro compounds (II)

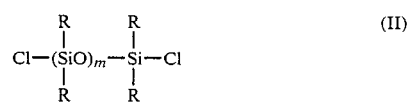

and the diphenols (I), for example in accordance with U.S. Pat. No. 3,419,634, column 3, in combination with U.S. Pat. No. 3,189,662.

In the bis-chloro compounds (II) R and m have the same meanings as in the diphenols (Ia) or (Ib).

The polycarbonates according to component (A) which are suitable in accordance with the invention can be branched in a known manner, preferably by the incorporation of 0.05 to 2.0 mol %, relative to the total diphenols employed, of trifunctional or polyfunctional compounds, for example compounds having three or more phenolic groups.

In addition to bisphenol A homopolycarbonate, preferred polycarbonates are the copolycarbonates of bisphenol A with up to 15 mol %, relative to the molar sum of diphenols, of 2,2-bis-(3,5-dibromo-4-hydroxyphenyl)-propane, or the copolycarbonates of the diphenols of the formula (I) with 1 to 20% by weight of diphenols of the formula (IIa), preferably of the formula (Ib), relative in each case to the total weight of the diphenols (I) and (Ia), or (I) and (Ib), respectively.

Rubbers suitable for the preparation of the graft polymers according to component (B) are, in particular, polybutadiene or butadiene/styrene copolymers containing up to 30% by weight, relative to the weight of rubber, of a lower alkyl ester of acrylic or methacrylic acid (for example methyl methacrylate, ethyl acrylate, methyl acrylate or ethyl methacrylate). Further examples of suitable rubbers are polyisoprene or polychloroprene. Alkyl acrylate rubbers based on $C_1$-$C_8$-alkyl acrylates, in particular ethyl, butyl or ethylhexyl acrylate, are also suitable. These alkyl acrylate rubbers can, if appropriate, contain, in a copolymerized form, up to 30% by weight, relative to the weight of rubber, of monomers such as vinyl acetate, acrylonitrile, styrene, methyl methacrylate and/or vinyl ethers. These alkyl acrylate rubbers can also contain minor amounts, preferably up to 5% by weight, relative to the weight of rubber of ethylenically unsaturated monomers which have a crosslinking action. Examples of crosslinking agents of this type are alkylenediol di(meth)acrylates, polyester di(meth)acrylate, divinylbenzene, trivinylbenzene, triallyl cyanurate, allyl (meth)acrylate, butadiene or isoprene. Alkyl acrylates of this type are known. As a graft base, acrylate rubbers can also be products containing, as the core, a crosslinked diene rubber formed from one or more conjugated dienes, such as polybutadiene, or a copolymer of a conjugated diene with an ethylenically unsaturated monomer, such as styrene and/or acrylonitrile. Examples of other suitable rubbers are: EPDM rubbers, that is to say rubbers formed from ethylene, propylene and a non-conjugated diene monomer.

Preferred rubbers for the preparation of the graft polymers (B) are diene and alkyl acrylate rubbers.

The rubbers are present in the graft polymer (B) in the form of at least partially crosslinked particles having an average particle size of 0.09 to 5 $\mu$m, in particular 0.1 to 1 $\mu$m. The graft polymers (B) are prepared by free-radical graft polymerization of the mixtures of monomers defined initially in (B.1.1) and (B.1.2), in the presence of the rubbers (B.2) to be grafted, and they are without exception known.

Preferred processes for the preparation of the graft polymers (B) are emulsion, solution, bulk or suspension polymerization. Graft polymers (B) which are particularly preferred are the so-called ABS polymers. Halogenostyrenes and p-methylstyrene may be mentioned as nuclear-substituted styrenes.

Preferred copolymers according to component (C) are those formed from at least one monomer belonging to the series comprising styrene, $\alpha$-methylstyrene, halogenostyrene or methyl methacrylate as defined in (C.1) together with at least one monomer belonging to the series comprising acrylonitrile, methacrylonitrile, methyl methacrylate, maleic anhydride or an N-substituted maleimide as defined in (C.2).

Copolymers according to component (C) are frequently formed as byproducts in the graft polymerization carried out for the preparation of the component, (B), particularly when large amounts of monomers are grafted on to small amounts of rubber.

The amount of copolymer (C), to be employed in accordance with the invention, of 10 to 70 parts by weight, relative to 100 parts by weight of (A)+(B)+(C), does not include these byproducts of the graft polymerization.

The copolymers according to component (C) are resinlike, thermoplastic and rubber-free. Particularly preferred copolymers, (C) are those formed from styrene by means of acrylonitrile and, if appropriate, by means of methyl methacrylate, from $\alpha$-methylstyrene by means of acrylonitrile and, if appropriate, by means of methyl methacrylate, or from styrene and $\alpha$-methylstyrene by means of acrylonitrile and, if appropriate, by means of methylmethacrylate.

Particularly preferred ratios by weight in the thermoplastic copolymer (C) are 60 to 80% by weight of (C.1) and 40 to 20% by weight of (C.2).

The copolymers according to component, (C) are known and can be prepared by free-radical polymerization, in particular by emulsion, suspension, solution or bulk polymerization. The copolymers according to component C) preferably have molecular weights $\overline{M}w$ (weight average, determined by light scattering or sedimentation) between 20,000 and 200,000 or intrinsic viscosities [$\eta$] between 20 and 110 ml/g, measured in dimethylformamide at 25° C.

The preparation of the copolymers (D) according to the invention can be effected in a manner which is in itself known by solution, suspension or emulsion polymerization or by a combination of these processes; emulsion polymerization is preferred.

This is preferably carried out using anionic emulsifiers, such as, for example, sodium, potassium or ammonium salts of long-chain fatty acids having 10-20 C atoms, for example potassium oleate, alkylsulphates having 10-20 C atoms, alkylarylsulphonates having 10-20 C atoms or alkali metal or ammonium salts of disproportionated abietic acid.

The polymerization can be carried out within a wide temperature range; it is preferably carried out at between 30° and 100° C., particularly preferentially between 50° C. and 80° C.

Suitable initiators which form free radicals are organic and inorganic peroxides, inorganic persulphates, such as, for example, potassium persulphate, azo-initiators, such as, for example, azobisisobutyronitrile, and Redox systems consisting of an oxidizing agent, preferably a peroxide, and a reducing agent. It is preferable to employ potassium persulphate as the initiator; the amounts employed are between 0.1 and 0.5% by weight (relative to the amount of monomer).

The copolymers (D) according to the invention have an intrinsic viscosity of 2-10 ml/g, measured in DMF at 25° C. These intrinsic viscosities are achieved by polymerizing a mixture of one or more of the unsaturated monomers according to (D.2) and, if appropriate, (D.1) and ($C_1$-$C_{18}$-alkyl mercaptans, the mercaptan acting as a chain transfer agent being incorporated as a terminal thioalkyl group.

Examples of $C_1$-$C_{18}$-alkyl mercaptans which can be employed are ethyl mercaptan, n-propyl mercaptan, n-butyl mercaptan, tert.-butyl mercaptan, n-pentyl mercaptan, n-hexyl mercaptan, n-octyl mercaptan, n-decyl mercaptan, n-dodecyl mercaptan, tert.-dodecyl mercaptan, n-hexadecyl mercaptan and n-octadecyl mercaptan.

Preferred alkyl mercaptans are tert.-dodecyl mercaptan, n-dodecyl mercaptan or mixtures thereof.

Further details on sulphur-containing copolymers of this type are contained in German Patent Application No. P 3,505,747.5 and the corresponding U.S. application Ser. No. 827,401, filed on Feb. 2, 1986, now U.S. Pat. No. 4,740,573.

The mixtures according to the invention, containing the components (A), (B), (C) and (D) and, if appropriate, the customary additives, such as fire-retarding agents, stabilizers, pigments, mould release agents and-/or antistatic agents, are prepared by mixing the various ingredients in a known manner simultaneously or successively at room temperature or at an elevated temperature and then melt-compounding or melt-extruding the mixture at temperatures from 200° to 300° C. in customary units, such as internal kneaders, extruders or twin-screw extruders.

The present invention also relates, therefore, to a process for the preparation of thermoplastic moulding materials containing the components (A), (B), (C) and (D) and, if appropriate, fire-retarding agents, stabilizers, pigments, mould release agents and/or antistatic agents, which is characterized in that the components (A), (B), (C), (D) and, if appropriate, fire-retarding agents, stabilizers, pigments, mould release agents and/or antistatic agents are mixed in a known manner and the mixture is then melt-compounded or melt-extruded at temperatures from 200° C. to 300° C. in customary units.

The moulding materials of the present invention can be used for the production of shaped articles of any kind, it being possible to use customary methods of production, in particular to produce shaped articles by injection moulding. Examples of shaped articles which can be produced are casing components of any kind (for example for household equipment, such as juice squeezers, coffee machines or mixers) or cover plates for the building industry, components for the automotive industry and computer casings. The moulding materials according to the invention are also employed in the field of electrical engineering, because they have very good electrical properties.

A further mode of processing the moulding materials according to the invention is the production of shaped articles by deep-drawing from sheets or films previously prepared by known processes.

In this application, particle size always denotes average particle diameter $d_{50}$, determined by ultracentrifuge measurements by the method of W. Scholtan et al., Kolloid-Z or u.Z. Polymere 250 (1972) 782–796.

EXAMPLES

Components employed
Polycarbonate (A) employed
Linear polycarbonate based on bisphenol A and having a solution viscosity of 1.28, measured in $CH_2Cl_2$ at 25° C. and in a concentration of 0.5 g/100 ml.

Graft polymer (B)
SAN graft polymer containing 50% styrene/acrylonitrile mixture (in a ratio by weight of 72:28) grafted on to 50% of particulate polybutadiene having an average particle size ($d_{50}$) of 0.4 μm, obtained by emulsion polymerization.

Copolymer (C)
Styrene/acrylonitrile copolymer having a styrene/acrylonitrile ratio of 72:28 and an intrinsic viscosity [η] of 55 ml/g (measured in dimethylformamide at 20° C.).

Preparation of the copolymer (D)
3.06 parts of styrene, 1.19 parts of acrylonitrile and 0.75 part of tert.-dodecyl mercaptan are emulsified, under nitrogen, together with 0.08 part of the sodium salt of disproportionated abietic acid in 68 parts of water, after which 0.3 part of potassium persulphate (dissolved in 24 parts of water) is added and the mixture is heated to 65° C. A mixture of 58.14 parts of styrene, 22.61 parts of acrylonitrile and 14.25 parts of tert.-dodecyl mercaptan and also a solution of 1.92 parts of the Sodium salt of disproportionated abietic acid in 25 parts of water are then metered in in the course of 4 hours, the reaction temperature being kept at 65° C. After a period for the completion of the reaction the latex is coagulated in a cold solution of magnesium sulphate in acetic acid. The polymer, which is obtained in a yield of 97% after drying at 70° C. in vacuo, has a sulphur content of 2.3% and an intrinsic viscosity of 6.7 ml/g (in dimethylformamide at 25° C.).

The components (A), (B), (C) and (D) were compounded on a 1.3 l internal kneader at temperatures between 200° and 220° C.

The shaped articles were produced on an injection moulding machine at 260° C.

The Vicat heat distortion point was determined as specified in DIN 53,460.

The Izod notched impact strength was determined on bars of dimensions 2.5×½×⅛" as specified in ASTM-D-256 for room temperature and −20° C.

Processability (flow) was assessed on the basis of the injection pressure required for the production of bars of dimensions 2.5×½×⅛" on the injection moulding machine used (temperature of material 260° C.) (see: Johannaber, Kunststoffe 74 (1984), 1, pages 1–5).

The table below shows the tests carried out and the test data obtained.

Compared with the comparison test, the formulations according to the invention have a markedly lower injection pressure than the comparison test. At the same time, the toughness level and the heat distortion point remain at an excellent level, customary for corresponding PC/ABS mixtures.

| | A parts by weight | B parts by weight | C parts by weight | D parts by weight | Notched impact strength room temperature J/m | −20° C. J/m | Vicat B 120, °C. | Injection pressure (260° C.), bar |
|---|---|---|---|---|---|---|---|---|
| Tests according to the invention | 60 | 24 | 16 | 2 | 515 | 431 | 117 | 123 |
| | 60 | 24 | 16 | 5 | 469 | 390 | 113 | 97 |
| | 60 | 24 | 11 | 5 | 511 | 445 | 115 | 114 |
| Comparison test | 60 | 24 | 16 | — | 532 | 453 | 119 | 143 |

What is claimed is:
1. Thermoplastic molding materials containing
(A) 20–80 parts by weight of a thermoplastic polycarbonate,
(B) 10–60 parts by weight of one or more graft polymers composed of
(B.1) 5–90 parts by weight of a mixture of
50–95% by weight of styrene, α-methylstyrene, nuclear-substituted styrene, methylmethacrylate or mixtures thereof, and as a different monomer
(B.1.2) 50–5% by weight of (meth)acrylonitrile, methyl methacrylate, maleic anhydride, N-substituted maleimide or mixtures thereof, grafted on to
B.2) 95–10 parts by weight of a rubber having a glass temperature $TG \leq 10°$ C. and
(C) 10–70 parts by weight of a thermoplastic copolymer having an intrinsic viscosity of 20 to 110 ml/g (measured in dimethylformamide at 25° C.) and formed from
(C.1) 50–95% by weight of styrene, α-methylstyrene, nuclear-substituted styrene, or mixtures thereof, and
(C.2) 50–5% by weight of (meth)acrylonitrile, the total of the parts by weight (A)+(B)+(C) amounting in each case to 100 parts by weight, and
0.5 to 7.5 parts by weight relative to 100 parts by weight of (A)+(B)+(C), of a copolymer formed from
(D.1) 0–90% by weight of styrene, α-methylstyrene, nuclear-substituted styrene or mixtures thereof, and

(D.2) 100-10% by weight of (meth)acrylonitrile characterized in that the component (D) has an intrinsic viscosity of 2 to 10 ml/g (measured in dimethylformamide at 25° C.), the chain length of the copolymer (D) being regulated by means of $C_1$–$C_{18}$-alkyl mercaptans.

2. Moulding materials according to claim 1, characterized in that the component (D) is present in amounts of 1 to 5 parts by weight.

3. Moulding materials according to claim 1, characterized in that the component (D) has an intrinsic viscosity of 4 to 7 ml/g.

4. Moulding materials according to claim 1, characterized in that they additionally contain at least one additive selected from the group comprising fire-retarding agents, stabilizers, pigments and antistatic agents.

* * * * *

UNITED STATES PATENT AND TRADEMARK OFFICE
CERTIFICATE OF CORRECTION

PATENT NO. : 4,895,898

DATED : January 23, 1990

INVENTOR(S) : Hans-Jurgen Kress, Herbert Eichenauer, Horst Peters, Jochen Schoeps and Karl-Heinz Ott It is certified that error appears in the above-identified patent and that said Letters Patent is hereby corrected as shown below:

Column 8, line 44, before "50-95%" insert --(B.1.1)--.

Signed and Sealed this

Fourteenth Day of July, 1992

Attest:

DOUGLAS B. COMER

*Attesting Officer*   Acting Commissioner of Patents and Trademarks